J. BLAYLOCK.
VALVE CONTROLLING GEAR FOR FLUID PRESSURE ENGINES.
APPLICATION FILED SEPT. 9, 1916.

1,258,860.

Patented Mar. 12, 1918.
2 SHEETS—SHEET 1.

Inventor:—
John Blaylock,
per:— Rayner & Co.
Attorneys.

J. BLAYLOCK.
VALVE CONTROLLING GEAR FOR FLUID PRESSURE ENGINES.
APPLICATION FILED SEPT. 9, 1916.
1,258,860. Patented Mar. 12, 1918.
2 SHEETS—SHEET 2.
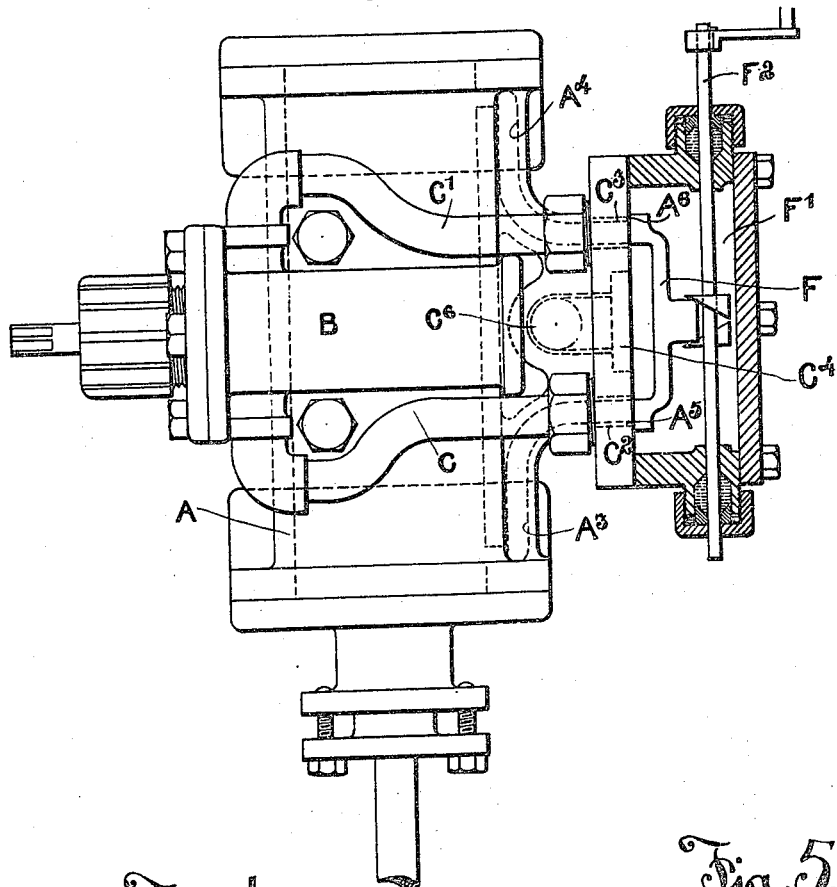
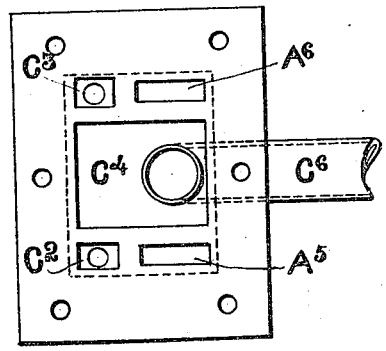
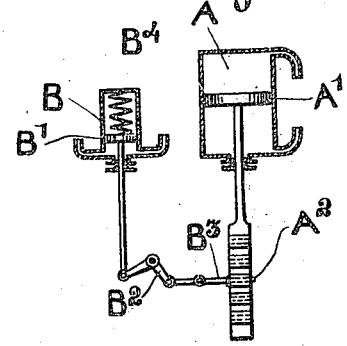
Inventor:—
John Blaylock,
per:- Rayner & Co
Attorneys.

UNITED STATES PATENT OFFICE.

JOHN BLAYLOCK, OF SOUTH BENWELL, NEWCASTLE-UPON-TYNE, ENGLAND.

VALVE-CONTROLLING GEAR FOR FLUID-PRESSURE ENGINES.

1,258,860.

Specification of Letters Patent.   Patented Mar. 12, 1918.

Application filed September 9, 1916.   Serial No. 119,221.

*To all whom it may concern:*

Be it known that I, JOHN BLAYLOCK, subject of the King of Great Britain and Ireland, resident of 30 Clara street, South Benwell, Newcastle-upon-Tyne, in the county of Northumberland, England, have invented certain new and useful Improvements in or Relating to Valve-Controlling Gears for Fluid-Pressure Engines, of which the following is a specification.

This invention consists of an improved controlling mechanism for the valve-gear of steam or other fluid-pressure-operated reciprocating engines, and it is applied to engines wherein the valves are operated through a link-motion or like mechanism which is adjustable to vary the cut-off and for reversing.

According to this invention there is provided in an engine of the type described, the combination with a fluid-pressure-operated piston for adjusting, directly or indirectly, the link-motion of a fluid-pressure-operated locking device which is automatically actuated prior to any actuation of the adjusting piston. Preferably the locking device takes the form of a second piston operating a bolt or like detent and a single valve controls both the adjusting and the locking pistons, being so arranged that it always admits pressure-fluid to, or exhausts it from, the locking piston before it admits to, or exhausts from, the adjusting piston. The result of this arrangement is that when it is desired to adjust the link motion for notching-up or reversing, the movement of the controlling valve just admits steam in the locking piston, so that the link-motion is unlocked and then admits steam to the adjusting pistons until the required adjustment has been made. The controlling valve is then moved to the exhausting position, and in so doing it first exhausts the locking cylinder causing the link-motion to be locked, and then exhausts the steam from the adjusting cylinder.

Other features of the invention will be hereinafter described with the particular embodiment of the invention as applied to a steam engine and illustrated in the accompanying drawings, in which:—

Fig. 3 is a plan of Fig. 1.

Fig. 4 shows the arrangement of parts in the controlling valve, and

Fig. 5 is a diagrammatic sketch of the general arrangement.

The mechanism comprises a link-motion adjusting-cylinder A and a locking cylinder B. The piston $A^1$ in the cylinder A is connected to a member $A^2$ (Fig. 5) which may be a perforated plate and this member is in turn connected to the link-motion, so that movement of the piston $A^1$ causes the movement necessary for notching up or reversing the valves of the engine to which this device is applied. The locking-cylinder B has a piston $B^1$ which is connected through a lever $B^2$ to a member $B^3$, (which may be a pin) which engages the member $A^2$ and holds it from movement. When the piston $B^1$ is raised, the member $B^3$ is withdrawn and the member $A^2$, with the link motion is free to be moved by the piston $A^1$. It is to be understood that the arrangement illustrated in Fig. 5 is purely diagrammatic and is shown merely to give a clear understanding of the working of the invention.

Referring now to Figs. 1 to 4, the preferred arrangement comprises a link-motion adjusting-cylinder A which is of the usual construction provided with steam-passages $A^3$, $A^4$ leading from each end to the ports $A^5$ $A^6$ respectively in the valve-chest (Fig. 4). A second cylinder B, which is the locking cylinder is arranged above the cylinder A with its longitudinal axis transverse to that of the cylinder A. The piston $B^1$ in the cylinder B is resiliently controlled by a spring $B^4$ so that it normally remains at one end of the cylinder. That end of the cylinder is connected by steam passages C $C^1$ with ports $C^2$ $C^3$ in the valve chest. These ports are situated beside the ports $A^5$ $A^6$ respectively and an exhaust port $C^4$ communicating with the exhaust $C^3$ is so dimensioned as to be common to all the steam ports.

Figure 1:
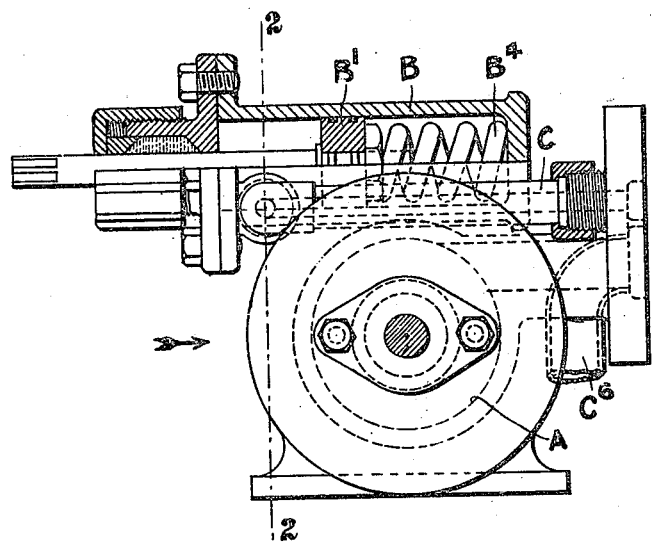
Figure 1 is an end elevation partly in section.
Figure 2:
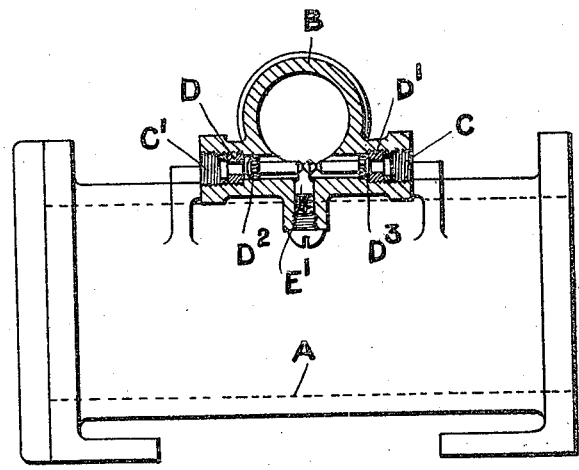
Fig. 2 is a part sectional view on the line 2—2 of Fig. 1.

Referring now to Fig. 2, the steam passages C $C^1$ are arranged to enter the cylinder B opposite one another. In the end of each passage is a valve seating D $D^1$, and the coöperating valves $D^2$ $D^3$ are mounted on a rod or spindle E. The valves $D^2$ $D^3$ are so positioned relatively to one another that when one is down on its seating the other is off its seating and opens communication through slots or recesses in its periphery from the corresponding steam passage to the cylinder B. A spring controlled tappet $E^1$ is arranged to engage notches $E^2$ in the spindle E and hold it in one position or the other until it is moved by high pressure steam as hereinbefore described.

The controlling valve for the whole mechanism is illustrated as an ordinary slide-valve or D-valve F, arranged to move over the ports $A^5$ $A^6$ $C^2$ $C^3$ $C^4$ in the steam chest $F^1$. The valve F is connected to a rotatable spindle $F^2$ by a double-spiral wedge or by a quick-threaded screw, and the spindle is connected by a suitable system of levers and links to the controlling handle which is operated by the driver.

The ports controlled by the valve F have been previously referred to, and are illustrated in Fig. 4. The ports $C^2$ $C^3$ which both communicate with the same end of the cylinder B are somewhat longer than the ports $A^5$ $A^6$ in the direction of travel of the valve, and the excess length is arranged on both edges of the port as shown in Fig. 4. The object of this arrangement is that whenever the valve F is moved, it will always open the port $C^2$ (or $C^3$) either to steam or exhaust before it opens the corresponding port $A^5$ (or $A^6$).

The operation of this device will now be described, it being assumed that the piston $A^1$ is at or near the upper end of the cylinder A in Fig. 3 and that it is required to move it downward therefrom.

The driver moves his controlling handle in such a direction that the spindle $F^2$ is rotated to move the valve F downward (Figs. 3 and 4) from its mid or central position. In the course of such movement the upper outside edge of the valve F opens the port $C^3$ to steam which thereupon passes along the passage $C^1$, till it meets the valve $D^2$. At the same time, the valve F has opened the port $C^2$ to exhaust, so that the passage C and valve $D^1$ $D^3$ also are both open to exhaust. The two valves $D^2$ $D^3$ are therefore subjected to steam pressure on one side and exhaust on the other and are consequently moved to the position shown in Fig. 1. High pressure steam therefore passes from the passage $C^1$ into the cylinder B, and it cannot escape to exhaust by the passage C because the valve $D^2$ has been closed down on its seating. The piston $B^1$ is therefore moved inward against the action of the spring $B^4$ and this movement is transmitted to the locking member, indicated at $B^3$ in Fig. 5 so that it is moved to its unlocking position.

It will be appreciated that this action takes place very rapidly, while the valve F is being moved by the driver. The continued movement opens the port $A^6$ to steam, which passes by the passage $A^4$ into the cylinder A and moves the piston $A^1$ in the required direction. Simultaneously the port $A^5$ has been opened to exhaust so that this movement is not prevented by steam or air trapped in the cylinder. When the desired adjustment of the link-motion has been obtained the driver returns his controlling handle to the central position so that the valve F is moved to its mid position. Steam is thereby cut off from the ports $A^6$ $B^3$ and they are put instead in communication with the exhaust. Owing to the greater length of the port $C^3$ it is first opened to exhaust and the steam in the cylinder B returns through the passage $C^1$ and port $C^3$ to the exhaust. The spring $B^4$ thereupon returns the piston $B^1$ to its original position, and the link-motion is locked in the position to which it has been adjusted. After the locking has thus been effected the valve F opens the port $A^6$ to exhaust so that the steam pressure is released from the piston $A^1$, and all the ports of the mechanism are in their normal position ready for another operation.

The particular construction hereinbefore described is not intended to limit the scope of the invention for obviously many modifications and alterations can be made in the construction and disposition of the various parts of the mechanism, and in addition the invention can be applied to any fluid pressure engines, and not only to steam engines.

What I claim as my invention and desire to secure by Letters Patent is:—

1. In a fluid-pressure operated means for adjusting a link-motion, the combination of an adjusting cylinder, an adjusting piston therein operatively connected to the link-motion, a locking cylinder, a locking piston therein, locking means connected to said locking piston, resilient controlling means operative in one direction on said locking piston, two fluid-pressure conduits connected to opposite ends of said adjusting cylinder, two other fluid-pressure conduits connected both to the same end of said locking cylinder, a valve controlling the admission to and exhaust from said four conduits and so arranged that when moved it first opens simultaneously the two conduits of the second pair to admission and exhaust respectively, and subsequently opens the two conduits of the first pair also to admission and exhaust respectively, a non-return valve in each of said second pair of conduits, and an operative connection between said valves whereby the opening movement of either valve causes the closing of the other.

2. In a fluid-pressure operated means for adjusting a link-motion, the combination of an adjusting cylinder, an adjusting piston reciprocatable therein operatively connected to the link-motion, a locking cylinder, a locking piston therein, locking means operatively connected to said locking piston, resilient controlling means normally holding said locking piston and locking device in the locking position, two fluid pressure conduits connected one to each end of said adjusting cylinder, two other fluid pressure conduits connected to the same end of said locking cylinder to operate the piston therein against the resilient controlling means, a reciprocating slide valve controlling said four conduits, so arranged that when moved it first opens simultaneously the two conduits of the second pair to admission and exhaust respectively, and subsequently opens the two conduits of the first pair also to admission and exhaust respectively, manually operated means for moving said slide-valve, a non-return valve in each of said second two conduits, and an operative connection between said non-return valves whereby when either is operated the other is simultaneously closed.

JOHN BLAYLOCK.

Copies of this patent may be obtained for five cents each, by addressing the "Commissioner of Patents, Washington, D. C."